G. W. BAKER.
Cloth Folding and Cutting Machine.
No. 224,571. Patented Feb. 17, 1880.
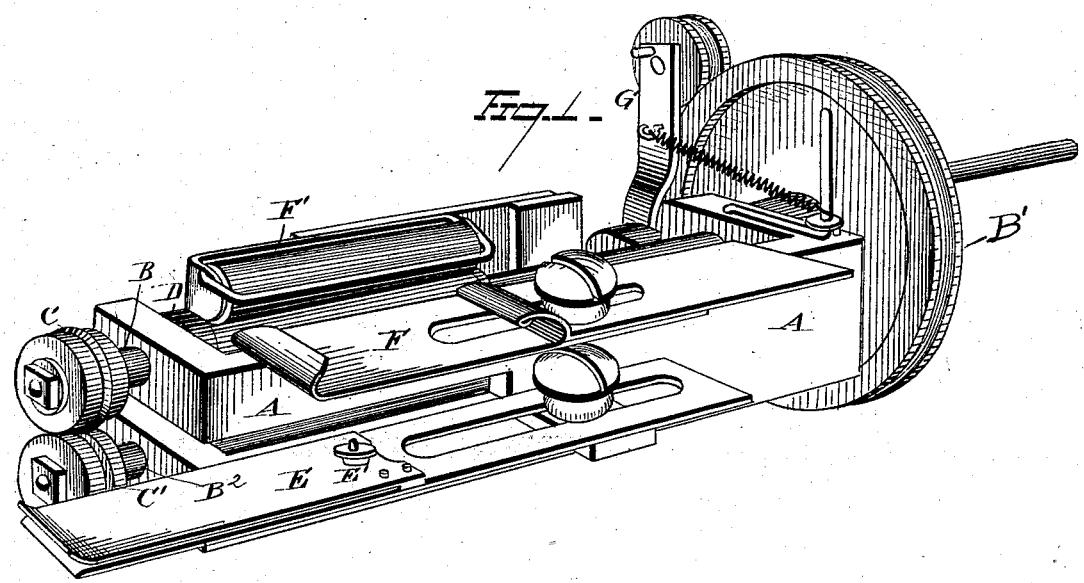
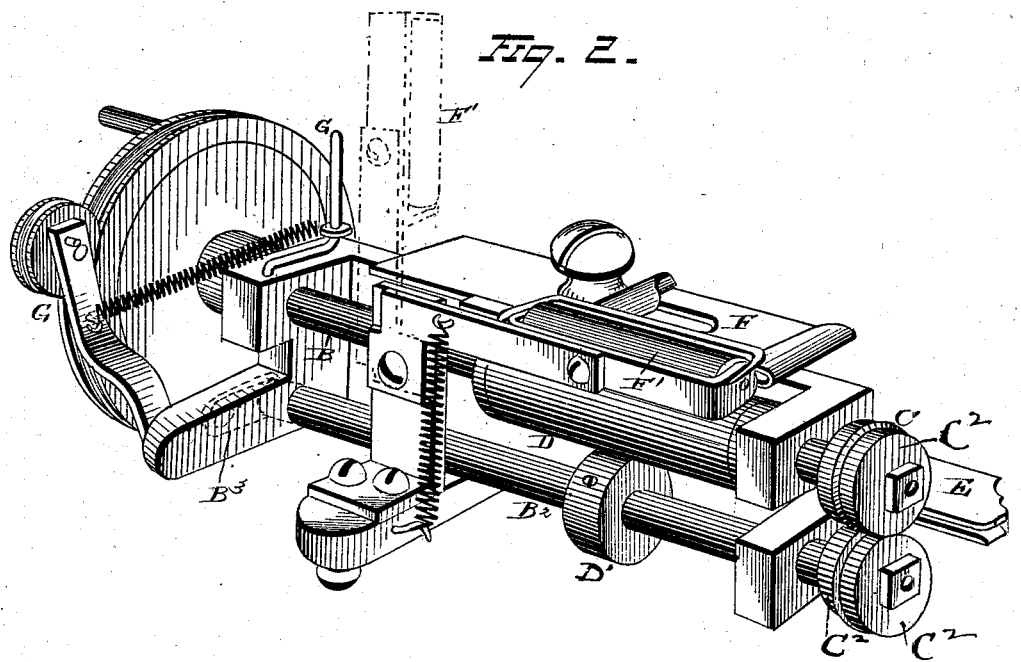

UNITED STATES PATENT OFFICE.

GEORGE W. BAKER, OF CLEVELAND, OHIO.

CLOTH FOLDING AND CUTTING MACHINE.

SPECIFICATION forming part of Letters Patent No. 224,571, dated February 17, 1880.

Application filed April 26, 1879.

*To all whom it may concern:*

Be it known that I, GEORGE W. BAKER, of Cleveland, in the county of Cuyahoga and State of Ohio, have invented certain new and useful Improvements in Cloth Folding and Cutting Machinery; and I do hereby declare the following to be a full, clear, and exact description of the invention, such as will enable others skilled in the art to which it pertains to make and use it, reference being had to the accompanying drawings, which form part of this specification.

The object of my device is to afford a quick, easy, and reliable means of cutting and preparing fabric for the purposes of binding, trimming, &c.

In the drawings, Figure 1 represents an isometric view of a device constructed according to my invention, and Fig. 2 is another isometric view of the same device.

A is a frame, made preferably of metal, and constructed in suitable dimensions and fashion to accommodate the various parts of the device, as hereinafter specified.

B is the main shaft, driven by a crank or wheel, B'. C C' are two blades of a rotary shears, the blade C being fixed upon the shaft B, and the blade C' upon a parallel shaft, $B^2$. Upon one or both sides of each blade C C' is placed a washer or roller, $C^2$, which act as feeding-rollers to the cutters C C'.

D and D' are rollers fixed, respectively, upon the shafts B $B^2$, one of which (preferably the roller D) is made elastic and stationary, while the other roller, D', is made solid and also adjustable upon its shaft.

The shaft $B^2$ is allowed a certain amount of longitudinal play in its bearings, and is made, at its end opposite its cutter C', to project beyond its bearing and to receive the pressure of a spring, $B^3$. This spring, by its pressure upon the end of the shaft $B^2$, will operate at all times to keep the blades C C' properly together, so that a shearing cut will always be insured.

As a matter of convenience the cutters C C' may be made removable in order to facilitate replacement and repairs, as necessary.

In front of the cutters C C' is placed the guide E, adapted to be longitudinally adjustable upon the frame A by any suitable slot and set-screw or equivalent arrangement. This guide E may be of any character to properly direct the fabric while being fed through the cutters C C'.

I have here shown a convenient form, which consists of two plates, between which the fabric is passed, and these plates are made to pinch more or less tightly upon the fabric passing between them by the operation of a clamping thumb-screw, E'.

The folding function of my device is primarily accomplished by the folder F, which I prefer to make adjustable in itself, and also adjustable longitudinally upon the frame A, by suitable slot and thumb-screw or equivalent contrivance. The form of this folder is sufficiently shown in the drawings, and is adapted to turn over both edges of a fabric passing through it. After this is done the fabric is passed between the rollers D and F', and these rollers are held together with sufficient tightness to fix the fold formed by the device F'.

I prefer hinging the roller F' in such a manner that it, or the frame in which it is journaled, may be swung free from the roller, as indicated by the dotted lines in the drawings. In this case the roller F' should be made to rock in its frame, or be otherwise constructed in such a manner that it shall always and automatically adjust itself in proper juxtaposition against the roller D.

When used as an attachment to a sewing-machine the switch G will serve a useful purpose. This switch consists, essentially, of a friction-pulley revolving upon the end of a lever pivoted to the frame A, which lever may be drawn in, so that a driving-belt may be tightened or loosened upon the driving-wheel B' in such a manner as that when the switch is turned off the belt shall not drive the wheel B', and so that said belt shall be brought into operative contact by closing the switch.

The operation of my device is as follows: Upon drawing or closing the switch G, or by turning the crank or wheel B', the machine is set in motion. To cut the fabric it is placed between the plates of the guide E, which has been previously adjusted, and as it approaches the cutters C C' it is received by the rollers $C^2$ and the rollers D D', and thus fed and cut into strips, the width of which is determined by the adjustment of the guide E. After being cut the strip is, by the action of the rollers D F', drawn through the folder F, whereby both of its edges are turned in upon each other, and are pressed and retained in this folded condition by the action of the rollers D and F' aforesaid. Thus prepared, the fabric is ready to be used as trimming or otherwise.

What I claim is—

1. The combination, with the roll secured to the upper rotary shaft, of the presser-roll located above the same, and mechanism, substantially as described, whereby said presser-roll is adapted to be automatically maintained in vertical position when swung away from the shaft-roll, substantially as set forth.

2. The combination, with a rotary shaft whose extremity is provided with the annular blade and feed-roll, while its central portion is provided with the elastic roller, of a parallel rotary shaft whose extremity is provided with the annular blade and feed-roll, while its central portion is provided with the roller secured in longitudinal adjustment thereon, substantially as set forth.

In testimony whereof I have signed my name to this specification in the presence of two subscribing witnesses.

GEORGE W. BAKER.

Witnesses:
L. L. LEGGETT,
JNO. CROWELL, Jr.